Sept. 24, 1940.   A. J. STONE   2,215,485
REFRIGERATING APPARATUS
Filed Dec. 9, 1937   2 Sheets-Sheet 1

Inventor:
Andrew Jackson Stone
By Brown, Jackson, Boettcher & Dienner
Attys.

Sept. 24, 1940.   A. J. STONE   2,215,485
REFRIGERATING APPARATUS
Filed Dec. 9, 1937   2 Sheets-Sheet 2
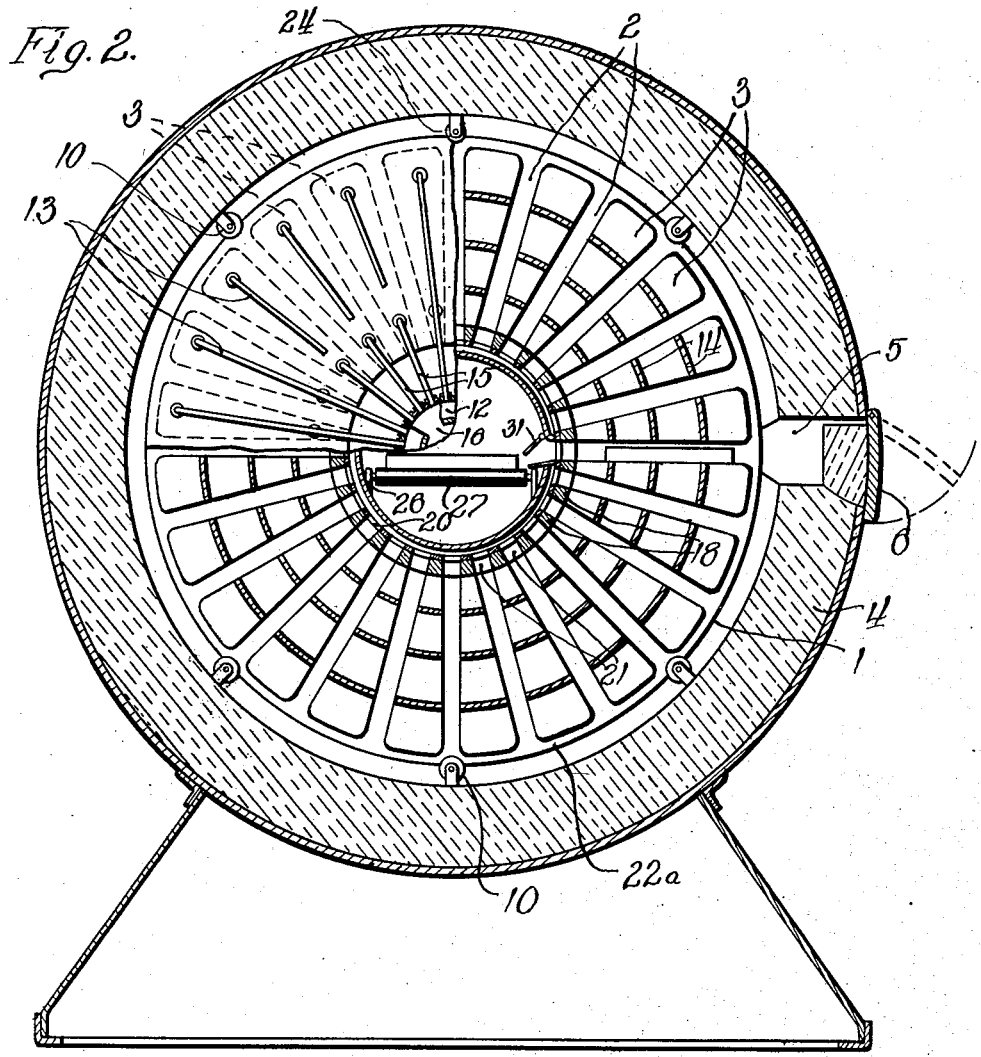
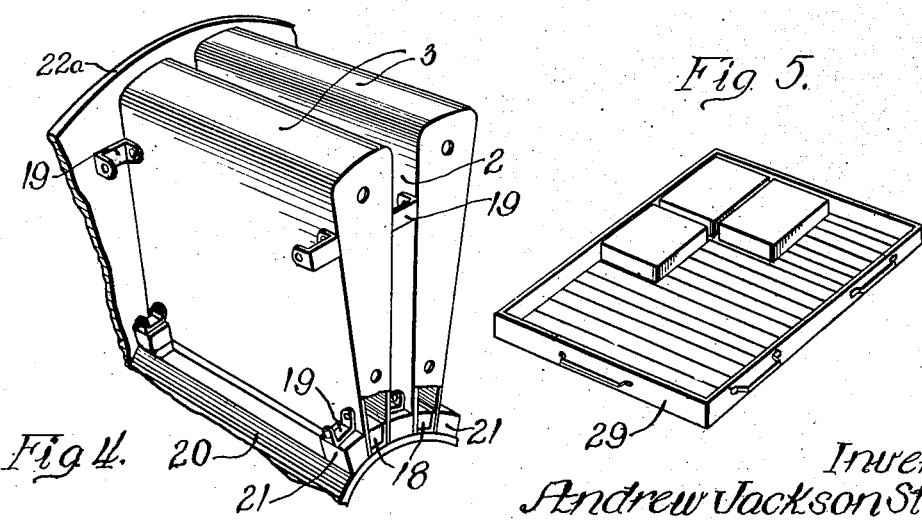
Inventor:
Andrew Jackson Stone
By Brown, Jackson, Boettcher & Dienner
Attys.

Patented Sept. 24, 1940

2,215,485

UNITED STATES PATENT OFFICE 2,215,485

REFRIGERATING APPARATUS

Andrew Jackson Stone, London, England, assignor of one-half to Robert L. Hague, New York, N. Y.; City Bank Farmers Trust Company and Walter E. Godfrey, executors for Robert L. Hague, deceased Application December 9, 1937, Serial No. 178,840
In Great Britain January 13, 1937

19 Claims. (Cl. 62—114)

This invention relates to refrigeration and has reference particularly to what is generally known as quick freezing and the object of the invention is to provide a system of refrigeration which, while of general application, is particularly suitable for mobile plant which can be taken to such places as orchards and market gardens so that the product can be frozen immediately it has been gathered and when so frozen will be ready packed in condition for marketing.

The invention consists broadly of a refrigerating apparatus comprising a continuously rotating freezing drum having freezer compartments into which the articles to be frozen are introduced at one position and withdrawn in frozen condition after the rotating drum has performed one revolution, and a further object of the invention is to provide for regularity in the refrigeration conditions and continuous output.

In order that the invention may be readily understood and carried into practice reference is hereby made to the accompanying drawings which illustrate, by way of example, a plant constructed and designed to operate in accordance with the invention.

Figure 1:
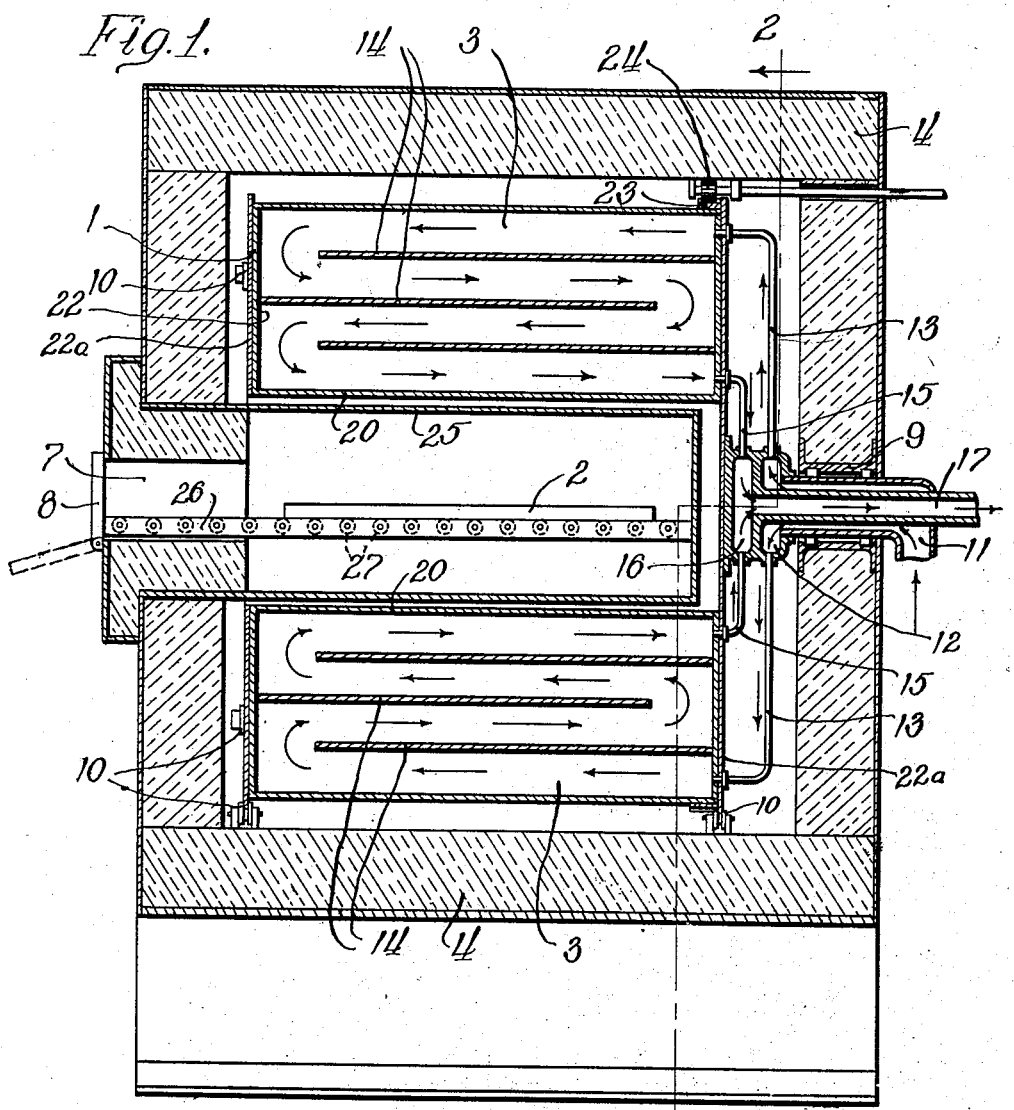
Figure 3:
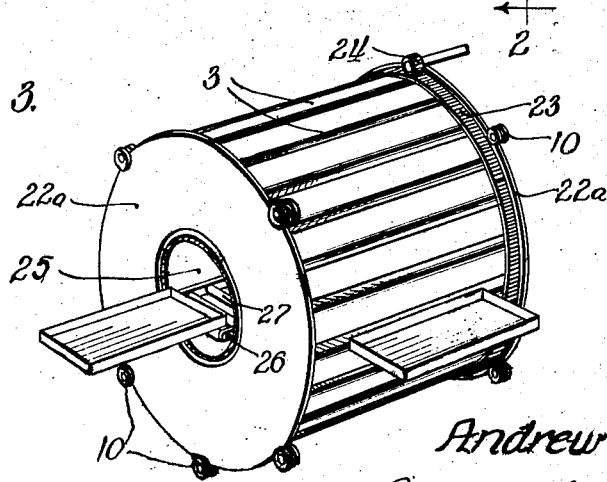

In these drawings Figure 1 is a diagrammatic sectional elevation of the refrigerator drum, Figure 2 is a sectional end view taken on the line 2—2 of Figure 1, Figure 3 is a perspective diagram of the drum removed from its containing casing, Figure 4 is a fragmentary perspective view illustrating the preferred construction of the refrigerant chambers, and Figure 5 is a perspective view of one form of tray for carrying the packages to be frozen.

Referring to these drawings the numeral 1 designates the refrigerator drum which is composed of a number of radial freezer compartments 2 arranged between the walls of refrigerant chambers 3 through which the refrigerating medium circulates. This drum is contained within a lagged outer casing 4 and access into the freezer compartments is provided for through a passage 5 closed by a hinged flap door 6 and egress from the drum is provided for through an opening 7 similarly closed by a hinged flap door 8 as will be more readily understood hereafter when the method of operation of the apparatus is more fully described. The refrigeration drum is mounted to rotate upon the central bearing 9 and the roller supports 10. The refrigerating liquid medium is supplied from any suitable source to an inlet 11 which leads into an annular chamber 12 and the refrigerant liquid passes, by way of pipes 13, to the outer ends of the refrigerant chambers 3 and after circulating around the baffles 14 passes out, by way of pipe 15, into the outlet chamber 16 whence it passes by way of the axial outlet pipe 17 back into the circulating system. The circulation of the refrigerant liquid is effected by any suitable pump but preferably the inlet into the drum is on the suction side of the pump system.

The refrigerant chambers 3 are preferably constructed of sheet metal of good heat conductivity the sheet metal being bent to the required form and the meeting ends welded or otherwise secured in leak proof manner to supporting blocks 18 and the various refrigerant chambers 3 are secured together and supported by staying brackets 19 as shown particularly in Figure 4. Each of these refrigerant chambers are attached to the rotating hub 20 between separator blocks 21 arranged at each end. It will be understood that the ends of the refrigerant chambers are closed by end plates 22 or by a common end disc 22a. Attached to the outer periphery of the rotating drum, at some convenient position, gear teeth 23 are provided with which a driving pinion 24 gears, and the speed of rotation of the drum will be according to the speed with which this pinion is driven and to this end the pinion can be driven through any form of variable gear so that the speed of rotation of the drum can be easily controlled and by this means the period and degree of refrigeration will also be controlled, as will hereafter appear.

The rotatable drum rotates about a fixed cylinder 25 and within this cylinder there is arranged a frame 26 supporting a number of rollers 27 which may be disposed on an incline leading to the outlet door 8.

The freezer compartments are preferably of width slightly greater than the width of the package to be frozen so that as the drum rotates the surfaces of the package in direct contact with the cold walls of the refrigerant chambers change so that during the complete revolution, which constitutes the full freezing period, one surface is in contact during half the revolution and the other surface is in contact during other half of the revolution. The importance of this is that it diminishes the tendency of the package or its carrying tray to adhere to the wall in which it is in contact and at the same time ensures equally of the freezing effect from both sides of the package.

The packages to be frozen are arranged in carrying trays which may take any desired form, but a convenient form is shown in Figure 5. This carrying tray 29 has a bottom of aluminum wire, and the appropriate number of packages can be loaded into this tray and the tray inserted into the apparatus. To facilitate unloading, the carrying tray may be provided with one or more of its walls hinged.

The operation of the machine is as follows: The drum 1 is caused to rotate slowly and rotates continuously. The operator inserts a containing tray through the door 6 into the position indicated in Figure 2 and as each compartment arrives at the changing position the changing operation is performed. After one revolution the tray first inserted will, of course, arrive again at the changing opening and therefore before a fresh carrying tray can be inserted the one already in position, which will have been properly frozen, has to be removed. The operator effects this removal by pushing the tray through the door 31 into the fixed cylinder or hub compartment 25 and the tray falls on to the rollers 27 and an operator at the discharge door 8 draws the tray out axially by way of the passage 7. Thus the operation is continuous and the degree of freezing is controlled as before indicated by controlling the speed of rotation of the drum 1.

The doors 6, 8 and 31 may not be absolutely necessary but they are distinctly advantageous in that they ensure regularity of freezing conditions and prevent the circulation of outside air into the apparatus which is the factor which disturbs the freezing conditions in refrigeration apparatus in general. It will be observed that the apparatus as hereinbefore described is of compact form and a complete unit can be mounted on a motor vehicle of reasonable size and then the apparatus can be taken to orchards, fish wharves and the like places and the freezing operation performed on the fresh material and in this connection it will be understood that the engine of the motor vehicle can be utilized for driving the compressor and circulating pumps of the apparatus producing and circulating the refrigerant medium.

I claim:

1. A refrigerating apparatus comprising a continuously rotating freezing drum having freezer compartments formed between refrigerant chambers, with walls substantially parallel to and radiating from the drum axis, into which compartments the articles to be frozen are introduced at one position and withdrawn in frozen condition after the rotating drum has revolved sufficiently to insure the desired degree of freezing.

2. A refrigeration apparatus comprising a rotatable drum having a plurality of radial freezer compartments arranged between refrigerating walls substantially parallel to and radiating from the drum axis, into which packages to be frozen are introduced from a peripheral position radially into the compartment and after freezing has been effected are transferred to a chamber at the centre of the drum and removed from said chamber axially of the drum.

3. A refrigeration apparatus comprising a rotatable drum having a plurality of radial freezer compartments arranged between chambers with walls substantially parallel to and radiating from the drum axis and through which a refrigerant is continuously circulated, into which compartments packages to be frozen are introduced radially from a peripheral position and after freezing has been effected are transferred to a chamber at the center of the drum and removed from said chamber axially of the drum.

4. In a refrigerating apparatus, a rotating drum comprising chambers with walls substantially parallel to and radiating from the drum axis and spaced to leave freezer compartments therebetween, and means for circulating a refrigerant liquid through said chambers, said means comprising pipes leading from an annular inlet chamber located adjacent the center or axis of the drum and pipes leading into an outlet chamber connecting with an outlet pipe disposed axially of the drum.

5. In a refrigerating apparatus, a rotating drum comprising refrigerant chambers with walls substantially parallel to and radiating from the drum axis and spaced to leave freezer compartments therebetween, said chambers each having an inlet opening, and an outlet opening and being provided with baffles to insure that the refrigerant liquid shall take a definite path from the inlet opening to the outlet opening.

6. In a refrigerating apparatus, a rotating drum comprising a plurality of refrigerant chambers with walls substantially parallel to and radiating from the drum axis and spaced apart to leave freezer compartments therebetween, said freezer compartments being slightly wider than the articles to be treated whereby during a revolution of the machine the articles fall from one cold surface to another so that the surfaces of the articles being frozen which are in direct contact with a cold surface change position, whereby adhesion is prevented.

7. In a refrigeration apparatus, a housing, a rotatable drum mounted in said housing and comprising freezer compartments arranged between refrigerating walls substantially parallel to and radiating from the drum axis, said housing having an opening into which packages are to be frozen are introduced from a peripheral position radially into the compartment, said packages after freezing being transferred to a chamber at the center of the drum, and said housing having another opening from which the frozen packages may be removed from said central chamber axially of the drum.

8. A refrigerating apparatus comprising a continuously rotating freezing drum having freezer compartments formed between refrigerant chambers with walls substantially parallel to and radiating from the drum axis, into which compartments the articles to be frozen are introduced at one position and withdrawn in frozen condition after the rotating drum has revolved sufficiently to insure the desired degree of freezing, said drum being driven by power and being provided with means for varying at will the speed of rotation.

9. In a refrigeration apparatus, a housing, and a rotatable drum mounted in said housing, said drum comprising a plurality of refrigerant chambers with walls substantially parallel to and radiating from the drum axis and spaced to provide freezer compartments therebetween, and said housing having an opening located to give access to said freezer compartments as rotation of the drum brings them successively into alignment therewith.

10. In a refrigeration apparatus, a housing, a rotatable drum mounted in said housing, said drum comprising a plurality of chambers with walls substantially parallel to and radiating from the drum axis and spaced to provide freezer compartments therebetween, means for circulating a refrigerant through said chambers, said means comprising an intake manifold and an outlet manifold with axial connections to the outside and tubes leading from each manifold to said chambers, and means providing access to said freezer compartments.

11. In a refrigeration apparatus, a housing, and a rotatable drum mounted therein, said drum comprising an axial hub and refrigerant chambers with walls substantially parallel to and radiating from the hub axis and spaced to provide freezer compartments therebetween, and said housing having an opening at the periphery of said drum whereby articles to be frozen may be introduced into said freezer compartments.

12. In a refrigeration apparatus, a housing, a rotatable drum mounted therein, said drum comprising an axial hub and refrigerant chambers mounted radially thereof and spaced to provide freezer compartments therebetween, and a stationary cylinder mounted co-axially within said hub, said housing having an opening at the periphery of said drum for access to said freezer compartments, and said cylinder having an opening aligned with said housing opening.

13. In a refrigeration apparatus, refrigerant chambers with parallel walls spaced to provide a freezer compartment therebetween, and a tray for insertion in said freezer compartment, said tray comprising a rectangular frame with cross wires forming the bottom thereof.

14. In a refrigeration apparatus, a housing, a rotatable drum mounted therein, said drum comprising an axial hub and refrigerant chambers mounted radially thereof and spaced to provide freezer compartments therebetween, a stationary cylinder mounted coaxially within said hub, said housing having an opening at the periphery of said drum for access to said freezer compartments, said cylinder having an opening aligned with said housing opening through which articles in said freezer compartments may be moved into said cylinder, and a receiving platform within said cylinder.

15. In a refrigeration apparatus, an insulating housing, a rotatable drum mounted therein, said drum comprising a hub, end plates, and radial refrigerant chambers extending lnogitudinally between said end plates and spaced to provide freezer compartments therebetween, a cylinder mounted stationarily and coaxially within said hub, a door-controlled opening in said housing at the periphery of said drum whereby articles to be frozen may be inserted in said freezer compartments, and an aligned door-controlled opening in said cylinder through which articles may be passed from said freezer compartments into said cylinder, said housing having also an opening giving access to said cylinder.

16. In a refrigeration apparatus, a housing, and a rotatable drum mounted in said housing, said drum comprising a plurality of radial refrigerant chambers wedge-shaped in cross section in plane normal to the drum axis and spaced to provide parallel-walled freezer compartments therebetween, and said housing having an opening located to give access to said freezer compartments as rotation of the drum brings them successively into alignment therewith.

17. In a refrigeration apparatus, a housing, and a rotatable drum mounted therein, said drum comprising an axial hub and refrigerant chambers with walls substantially parallel to and radiating from the hub axis and spaced to provide freezer compartments therebetween, and said housing having an opening at the periphery of said drum whereby articles to be frozen may be introduced into said freezer compartments, said introduction displacing frozen articles in said compartments into position within said hub.

18. A refrigerating apparatus comprising a continuously rotating freezing drum having freezer compartments formed between refrigerant walls substantially parallel to and radiating from the drum axis, into which compartments the articles to be frozen are introduced at one position and withdrawn in frozen condition after the rotating drum has revolved sufficiently to insure the desired degree of freezing.

19. In a refrigerating apparatus, a housing, and a rotatable drum mounted in said housing, said drum comprising a plurality of refrigerating walls substantially parallel to and radiating from the drum axis and spaced to provide freezer compartments therebetween, and said housing having an opening located to give access to said freezer compartments as rotation of the drum brings them successively into alignment therewith.

ANDREW JACKSON STONE.